United States Patent [19]

Benattar et al.

[11] 4,371,438

[45] Feb. 1, 1983

[54] FLUID TREATMENT APPARATUS, A CASING FOR ENCLOSING AND COMPRESSING A STACK OF FLAT ELEMENTS THEREIN, AND A PROCESS FOR MAKING SUCH AN APPARATUS

[75] Inventors: Robert Benattar, Lyons; Michel Cronenberger, Givors, both of France

[73] Assignee: SODIP, Meyzieu, France

[21] Appl. No.: 163,820

[22] Filed: Jun. 27, 1980

[30] Foreign Application Priority Data

Jul. 17, 1979 [FR] France ............................. 79 18981

[51] Int. Cl.³ ............................................ B01D 31/00
[52] U.S. Cl. ................................. 210/232; 210/321.3
[58] Field of Search ................... 210/321.3, 232, 236, 210/237, 238, 445, 350; 206/451; 220/306, 4 F

[56] References Cited

U.S. PATENT DOCUMENTS

| | | | |
|---|---|---|---|
| 4,016,082 | 4/1977 | Riede et al. | 210/321.3 |
| 4,039,455 | 8/1977 | Bardin et al. | 210/321.3 |
| 4,062,778 | 12/1977 | Riede | 210/321.3 |
| 4,133,764 | 1/1979 | Bardin et al. | 210/321.3 X |
| 4,159,250 | 6/1979 | Schnell | 210/321.3 X |

*Primary Examiner*—Frank A. Spear, Jr.

*Attorney, Agent, or Firm*—Gerald D. Sharkin; Robert S. Honor; Walter F. Jewell

[57] ABSTRACT

Fluid treatment apparatus is disclosed in which a stack of flat membrane elements and support plates are enclosed and compressed by means of a casing which comprises two endplates between which the stack is arranged, the internal faces of the endplates being adapted to contact the faces of the stack which is substantially parallel to the plane of the elements, and at least two lateral plates are located with their internal surfaces in front of the lateral faces of the stack. A number of studs and cooperating recesses are provided in adjacent surfaces of each lateral plate and each endplate, whereby the lateral plates and endplates are connected together within cooperating engagement surfaces, which are disclosed as being cylindrical, of its stud and recesses, hold the endplates and lateral plates together and thus hold the stack compressed.

In order to assemble, the stack is mounted between the endplates, and the endplates are compressed between the platens of a press whereafter the lateral plates are positioned with its studs and recesses in engagement. The platen pressure is released. The endplates and lateral plates may be secured, for example by ultrasonic welding.

26 Claims, 11 Drawing Figures

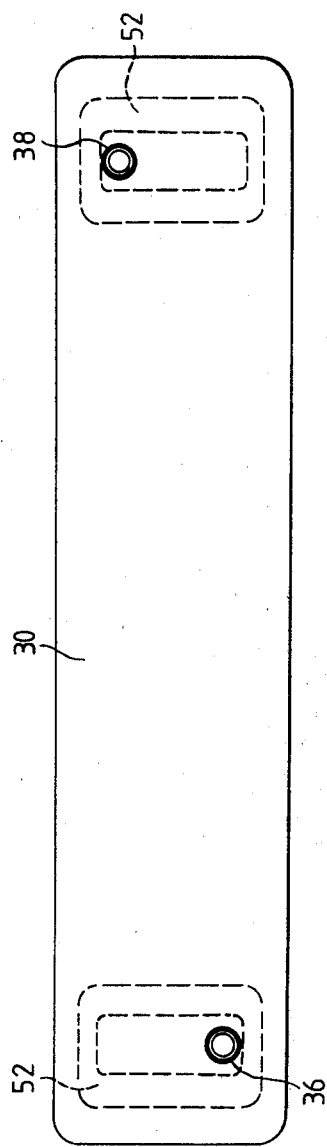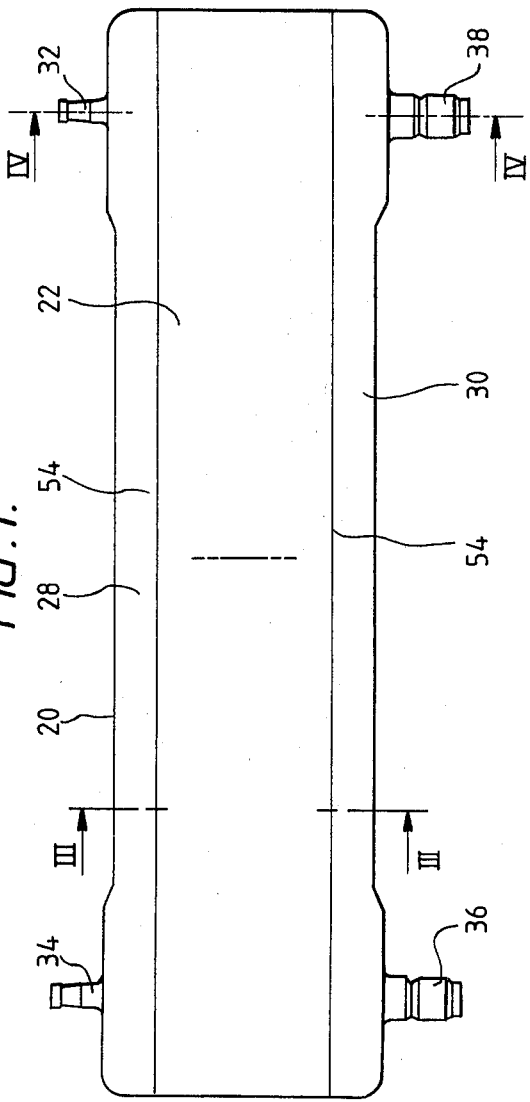

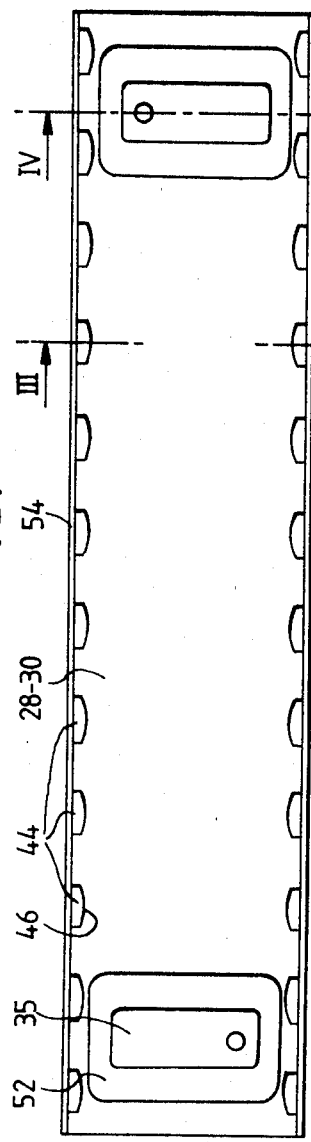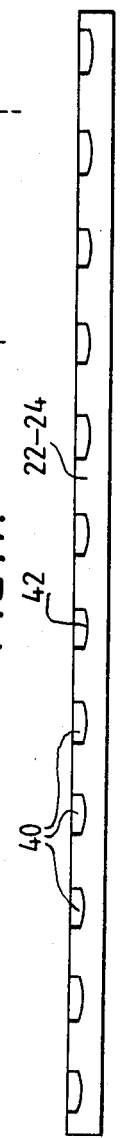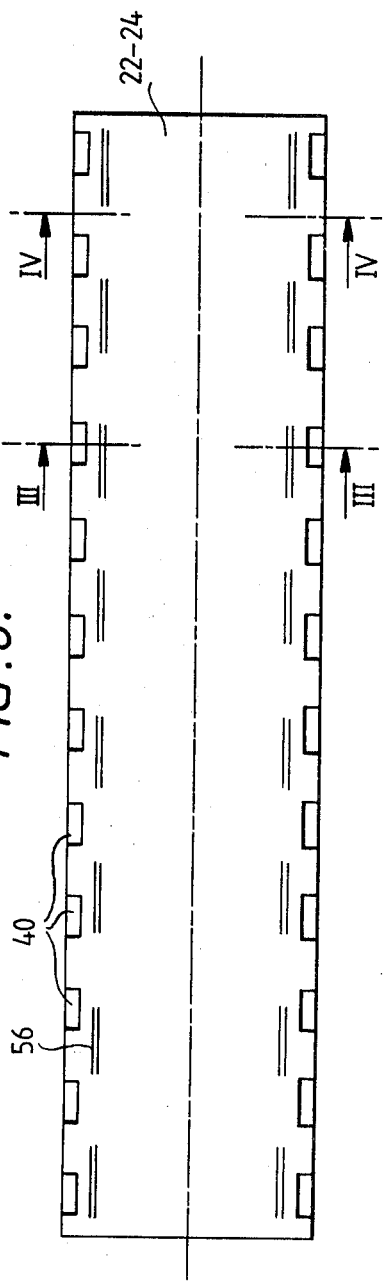

FLUID TREATMENT APPARATUS, A CASING FOR ENCLOSING AND COMPRESSING A STACK OF FLAT ELEMENTS THEREIN, AND A PROCESS FOR MAKING SUCH AN APPARATUS

BACKGROUND TO THE INVENTION

The present invention relates to fluid treatment apparatus and to a casing for enclosing and compressing a stack of elements in such an apparatus. It also relates to a process for forming the fluid treatment apparatus.

The stack may be such that it forms part of a blood treatment apparatus, such as a blood dialyser, blood filter or blood oxygenator, but the stack can also be intended for use in heat exchangers, gas filters, or separation devices or exchange devices in general. Such stacks usually consist of substantially plane elements, hereafter referred to as "elements". The elements can for example be sheets of semi-permeable membranes, or relatively thin plates, but can also be sheets of semi-permeable membranes together with their support plates.

The object of the present invention is to provide a casing which forms an envelope and which makes it possible to subject a stack such as described above to a compressive force, which essentially serves the purpose of establishing uniform and thin flow passages for the fluid or fluids which circulate in contact with the elements.

SUMMARY OF THE INVENTION

According to the present invention there is provided a casing for enclosing and compressing a stack of flat elements, said casing comprising two endplates between which the stack is to be arranged, the internal faces of the said endplates being adapted to contact the faces of the stack which are substantially parallel to the plane of the elements, at least two lateral plates, internal surfaces of said lateral plates adapted to be located in front of at least two lateral faces of the stack, at least one stud and at least one recess on adjacent surfaces of at least one lateral plate and at least one endplate, cooperatingly engageable, surfaces on said at least one stud and said at least one recess effective to connect said lateral plate and endplate together, when said surfaces are in engagement.

In the present specification, the term "lateral face" is applied to the faces of the stack which are substantially at right angles to the planes of the elements. The "opposite lateral faces" are the similar lateral faces of the stack, such as, for example, the two longitudinal lateral faces of a parallelepiped or rectangular stack or, in the case of a parallelepiped stack on a trapezoidal base, that is to say in the case of a stack consisting of trapezoidal elements, the "opposite lateral faces" can be the lateral faces along the bases of the said trapezia or the lateral faces along the other two sides of the said trapezia.

The term "lateral edges of the endplates" is applied to the edges of the endplates which correspond to the lateral faces of the stack, and the term "opposite lateral edges of the endplates" to the lateral edges of the endplates which correspond to the opposite lateral faces of the stack.

The term "edges of the lateral plates corresponding to the lateral edges of the endplates" refers to the edges of the lateral plates which are substantially parallel to the plane of the elements.

The endplates and the lateral plates may or may not consist of different materials which may or may not be homogeneous; in particular, they can be reinforced, for example by means of a metal framework. They may consist of metallic elements (for example of an aluminium alloy or steel) or of thermoplastics, such as polyolefines, polyamides, acrylic resins, polystyrene or their mixtures or copolymers which in particular possess good mechanical properties, especially good flexural strength and tensile strength. It is also possible to employ thermoplastics to which reinforcing fillers (in particular asbestos, carbon and, preferably, glass fibres) have been added.

The casing according to the invention can keep a stack, for example consisting of semi-permeable membranes and of support plates, under a compressive force, such that the compressive force between the various elements constituting the stack is sufficient firstly to ensure that there is no leak between two adjacent elements at their periphery and, secondly, that the flow passages for the fluid or fluids which flow in contact with the elements, for example in contact with the membranes, are both uniform and thin.

The recesses can be located along the lateral edges of the endplates and can co-operate with the studs located along the corresponding edges of the lateral plates. Alternatively, the studs can be located along the lateral edges of the endplates and co-operate with the recesses located along the corresponding edges of the lateral plates.

Of course the endplates can carry studs and/or recesses which can be formed on an extension or on a plurality of extensions located along the lateral edges of the endplates, for example on the external face of the endplates or on the face of the endplates which is substantially at right angles to the plane of the elements, or the recesses can be hollows which open onto the external face of the endplates as well as onto the face of the endplates which are substantially at right angles to the plane of the elements, or can be cavities which open only onto this latter face.

Equally, of course, the lateral plate can carry studs and/or recesses which can be formed on an extension or on extensions located along the lateral edges of the lateral plates, on the internal face of the plates (that is to say on the face of the lateral plates intended to be located on the inside of the apparatus), or the recesses can be holes or cavities located within the thickness of the lateral plates (the thickness being taken as the dimension parallel to the plane of the elements and at right angles to the edge of the lateral plates) and opening onto the internal faces of the lateral plates.

The term "engagement surface" denotes the surface of the stud and the surface of the recess which participate in the contact between the stud and the recess. Of course, the contact between the engagement surface of the stud and the engagement surface of the corresponding recess can be, for example, along at least one line of contact and/or can be over at least one surface.

The general shape of the engagement surfaces of the studs and of the recesses is not critical, but must be selected so that the engagement surfaces of the studs can be in contact with the engagement surfaces of the recesses and so that the relative positions of the studs and of the recesses are stable positions. Thus, the engagement surfaces can consist of the faces of a dihedron or of three faces of a parallelepiped. Preferably, the engagement surfaces consist of cylindrical surfaces. Of course, it is not necessary for the engagement surfaces of the studs and the recesses to have the same general shape; for example, studs of which the engagement surfaces are formed by the faces of a dihedron can cooperate with recesses of which the engagement surfaces are cylindrical surfaces.

Preferably, the engagement surfaces of the recesses are concave cylindrical surfaces.

Advantageously, the engagement surfaces of the studs are convex cylindrical surfaces which engage against the engagement surfaces of the recesses by making internal tangential contact along at least one straight line.

Desirably, the engagement surfaces of the studs and of the recesses are cylindrical surfaces of which the directrices are arcs of a circle. The chords subtending the said arcs of a circle and the generatrices of the said cylindrical surfaces are parallel to the plane of the elements, and the radius of the directrices of the studs is smaller than the radius of the directrices of the recesses. Furthermore, preferably the engagement surfaces of the studs and of the co-operating recesses are at right angles to the plane of the lateral face of the stack in front of which is located the lateral plate carrying the studs or the recesses.

Thus, in the case of studs and/or recesses of which the engagement surfaces are cylindrical surfaces, the generatrices of the said cylindrical surfaces are preferably at right angles to the plane of the lateral face of the stack in front of which is located the lateral plate carrying the studs or the recesses.

Since in general the internal face of the lateral plate is substantially parallel to the plane of the lateral face in front of which it is situated, it can be said that the engagement surfaces are at right angles to the plane of the lateral plate.

The engagement surfaces of the studs and/or of the recesses in general have a substantially smooth appearance but can also possess roughnesses; for example, they can be milled, striated, granite-like or grainy.

The edges of the lateral plates corresponding to the lateral edges of the endplates are advantageously provided with rims which cover the marginal zones of the said endplates, that is to say which cover a strip of the external surface of the endplate located along the lateral edges of the endplate.

Preferably, these rims are attached to the lateral edges of the endplates, for example by gluing or by welding. Advantageously, the rims are attached by ultrasonic welding, and the marginal zones of the lateral edges of the endplates and/or the internal face of the rims possess bosses which facilitate the ultrasonic welding.

One or both endplates of the casing can have inlet and/or outlet means for the fluid or fluids flowing in contact with the elements, if the said fluid or fluids enter and/or leave substantially at right angles to the plane of the elements.

The fluid or fluids flow in contact with the elements can also enter and/or leave substantially parallel to the plane of the elements; in that case the inlet and/or outlet means for at least one fluid are located on at least one lateral face of the stack. Such a stack is advantageously kept exposed to the action of a compressive force by means of a casing of which at least one lateral plate has inlet and/or outlet means for at least one fluid.

Advantageously each inlet and/or outlet means for the fluid is surrounded, on the internal face of a lateral plate, by at least one seat.

A leakproof packing can be placed in each seat, for example by injection of an appropriate product after the stack has been placed in the casing. Preferably, a gasket, which can be moulded-in or can be introduced loose, is placed in each seat.

Desirably, the gasket or gaskets is or are made of an elastic material and are held pressed against the lateral faces of the stack by means of the lateral plates.

Advantageously, plasticised polyvinyl chloride, or polyurethane elastomers or silicone elastomers, can be used as the elastic material for producing the gaskets.

The inlet and/or outlet means for the fluid can be surrounded, on the internal face of the lateral plate, by a single seat in which is placed a gasket which is advantageously formed with a peripheral groove which is open towards the lateral face of the stack. Preferably, a leakproof packing is placed in this groove. This leakproof packing is placed in position by injecting an appropriate product into the groove, after the stack has been placed in the casing.

The inlet and/or outlet means for the fluid can also, for example, be surrounded by two seats, a gasket being placed in each seat. The two gaskets define, between them, a groove on the internal face of the lateral plate; preferably a leakproof packing is placed in this groove and this can, as above, be done by injecting an appropriate product.

Advantageously, products such as polyurethane, epoxy or silicone adhesives can be used as appropriate for producing the leakproof packing.

Preferably, at least two lateral plates of the casing are placed in front of at least two opposite lateral faces of the stack. Of course, the device according to the invention can be such that several lateral plates can be placed in front of a single lateral face of the stack and that one or more lateral plates can be placed in front of each lateral face of the stack.

The invention also provides fluid treatment apparatus comprising a casing, a stack of flat elements positioned in said casing, said casing comprising two endplates between which the stack is arranged, internal faces of the said endplates being in contact with the faces of the stack which are substantially parallel to the plane of the elements, at least two lateral plates, internal surfaces of said lateral plates located in front of the two lateral faces of the stack, at least one stud and at least one recess on adjacent surfaces of at least one lateral plate and at least one endplate, and cooperatingly engaged surfaces on said at least one stud and said at least one recess, effective to connect said lateral plate and endplate together and to hold said endplates so that said stack is compressed.

Advantageously, the lateral plates have inlet and/or outlet means for at least one fluid. In such an apparatus, the inlet and/or outlet means for at least one fluid which are located on the lateral faces of the stack are surrounded by the gasket or gaskets located on the internal face of the lateral plates around the inlet and/or outlet means for the fluid, the said gaskets being kept pressed against the lateral faces of the stack by means of the lateral plates.

If the lateral plates do not have gaskets in the seats, the packing material placed in the seats comes into contact with the lateral face of the stack and surrounds the inlet and/or outlet means located on the lateral face of the stack.

The apparatus according to the invention can contain a stack consisting of sheets of semi-permeable membranes and support plates.

An apparatus according to the invention, comprising a device which forms the subject of the invention, can be assembled by carrying out the following steps:

making up a stack of elements, for example of semi-permeable membranes and of support plates;

placing the stack between two endplates, the faces of the stack parallel to the plane of the elements being in contact with the internal faces of the said endplates;

placing the assembly consisting of the stack and of the two endplates between the platens of a press;

applying the appropriate compressive force to the assembly, by means of the press, to give a compressive force between the various elements constituting the stack which is sufficient firstly to ensure that there is no leak between two adjacent elements at their periphery and, secondly, that the flow passages for the fluid or fluids which flow in contact with the elements are both uniform and thin;

connecting each lateral plate to the two endplates by placing the lateral plates in front of the lateral faces of the stack and engaging the studs in the corresponding recesses; and releasing the force from the press.

Before positioning the lateral plates, the engagement surfaces of the studs and/or of the recesses can be coated with adhesive.

If the lateral plates are provided with rims, the rims are attached to the marginal zones of the lateral edges of the endplates, for example by gluing. Preferably, the rims of the lateral plates are welded to the marginal zones of the lateral edges of the endplates by ultrasonics.

If the lateral plates have inlet and/or outlet means for at least one fluid, it is furthermore possible—in general after the force from the press has been released—to inject a leakproofing product into the seat of the lateral plates.

If the casing has a gasket, or gaskets, in the seat, or seats, of the lateral plates, the process of assembling the apparatus is similar to the process described above; however, before positioning the lateral plates, the gasket or gaskets are placed in the seat or seats provided for this purpose. Advantageously, after the force from the press has been released, an appropriate leakproofing product is injected into the groove which is either provided in the gasket or is defined between two gaskets.

The invention will be more easily understood from the following description, which is given merely by way of example, reference being made to the accompanying drawings.

BRIEF DESCRIPTION OF THE DRAWINGS

In the drawings:

FIG. 1 is a top view of a presently preferred embodiment of apparatus according to the invention;

FIG. 2 is a side view of the apparatus according to FIG. 1;

FIG. 5 is a view of the internal face of a lateral plate;

FIG. 6 is a view of the external face of an endplate;

FIG. 7 is a side view along the lateral edge of the endplate shown in FIG. 6;

DETAILED DESCRIPTION OF PREFERRED EMBODIMENT

Figure 3:
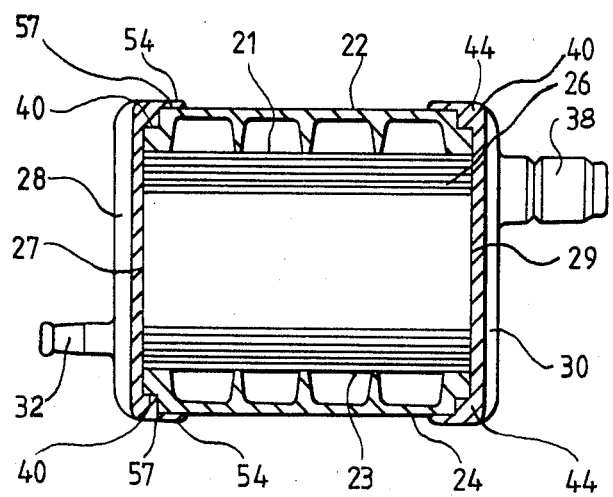
FIG. 3 is a section taken along plane III—III of the apparatus according to FIG. 1.

The casing 20 shown in FIGS. 1, 2, 3 and 4 has two endplates 22 and 24 and two lateral plates 28 and 30, the device exposing a stack 26 to the action of a compressive force. The lateral plates 28 and 30 are placed in front of the opposite lateral faces 27 and 29 of the stack 26.

The casing 20, which is described by way of example, is more particularly intended to be used for an apparatus for exchange between two fluids which flow respectively on opposite sides of a membrane.

The lateral plate 28 carries an inlet 32 and an outlet 34 for a first fluid, these being intended to be joined to feed and discharge lines for this first fluid. The lateral plate 30 is provided with an inlet 36 and an outlet 38 for a second fluid, intended to be joined to feed and discharge lines for this second fluid. Most commonly, as shown, the inlet and/or outlet for the fluid consist, on the lateral plate, of an orifice 31 which is joined to a nozzle 33 towards the exterior of the apparatus and to a distribution chamber 35 on the internal face of the lateral plate. Equally, it can be seen that on the internal face of the lateral plate, shown in FIG. 5, the inlet and/or outlet means for the fluid are surrounded by a seat 52.

The endplates 22 and 24 shown in FIGS. 6 and 7 have uniformly distributed recesses 40 along their opposite lateral edges. These recesses 40 have engagement surfaces 42 which are concave cylindrical surfaces of which the directrices are arcs of a circle and of which the generatrices are at right angles to the plane of the lateral plate and of the lateral face in front of which the lateral plate is located.

The two lateral plates 28 and 30 have uniformly distributed studs 44 along their edges (FIG. 5). The studs 44 have engagement surfaces 46 which are convex cylindrical surfaces, of which the directrices are arcs of a circle and of which the generatrices are at right angles to the plane of the lateral plate and of the lateral face in front of which the lateral plate is located.

FIG. 3 shows clearly how each lateral plate 30, 28 is joined to the two endplates 22, 24 by means of the studs 44 cooperating with the recesses 40.

Figure 10:
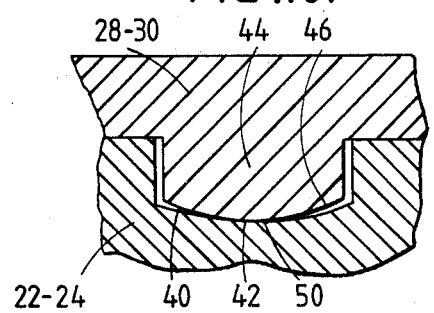
FIG. 10 is a detailed view of a cooperating stud and recess, in section in a plane at right angles both to the plane of the elements and to the straight line of contact between the engagement surfaces of the stud and of the recess.
Figure 11:
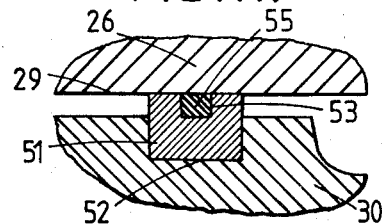
FIG. 11 is a detailed view in section in a plane at right angles to a lateral face of the stack, showing a seat in which is placed a gasket of which the groove is provided with a leakproof packing.

FIG. 10 shows how a stud 44 and a recess 40 cooperate via their engagement surfaces 42 and 46. The engagement surface 46 of the stud 44 is internally tangential to the engagement surface 42 of the recess 40, along a straight line of contact, of which only the trace 50 is visible in the plane of section, the radius of the directrix of the engagement surface of the stud being less than the radius of the directrix of the engagement surface of the recess.

Figure 4:
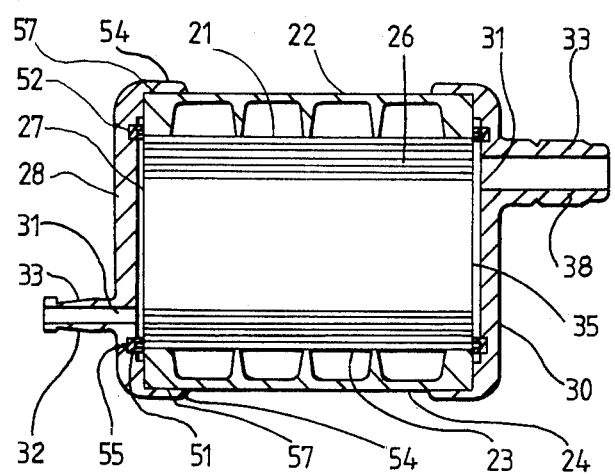
FIG. 4 is a section taken along plane IV—IV of the apparatus according to FIG. 1.
Figure 8:
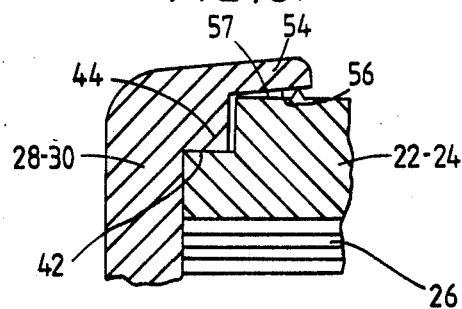
FIGS. 8 and 9 are detailed views in section, before and after welding, and taken along a plane passing through the straight line of contact of the two engagement surfaces of a stud cooperating with a recess, the said plane being at right angles to the plane of the elements.
Figure 9:
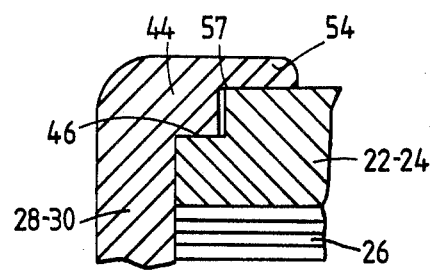

FIG. 4 shows clearly the inlet and/or outlet means for fluids, consisting of an orifice 31 to which are connected a nozzle 33 towards the outside of the apparatus and a distribution chamber 35 on the internal face of the lateral plate.

The inlet and/or outlet for the fluid are surrounded, on the internal face of the lateral plate, by a seat 52 in which is placed a gasket 51 which has a groove 53 open towards the lateral face of the stack 26. A leakproof packing 55 is placed in this groove.

The edges of the lateral plates 28, 30 corresponding to the lateral edges of the endplates 22, 24 have rims 54 which cover the marginal zones 57 of the lateral edges of the endplates. The marginal zones 57 are provided with bosses 56 which facilitate fixing the rims to the lateral edges of the endplates by ultrasonic welding.

The casing according to the present invention, can be assembled onto a stack of elements to form a fluid treatment apparatus in the manner described below with reference to FIGS. 3 and 4.

The stack 26 of elements, for example of semi-permeable membranes and support plates, is made up.

The stack 26 thus obtained is placed between the two endplates 22, 24, the faces of the stack parallel to the plane of the elements being in contact with the internal faces 21, 23 of the said endplates 22, 24, and the thus formed assembly is placed between the platens of a press (which are not shown). The press is operated at a particular pressure to ensure that the compressive force between the various elements constituting the stack is sufficient firstly for there to be no leakage between two adjacent elements at their periphery and, secondly, for the flow passages for the fluid or fluids which circulate in contact with the elements to be both uniform and thin.

After having, where appropriate, positioned the gaskets 51 in the recesses 52 provided on the internal faces of the lateral plates 28, 30, each lateral plate 28, 30 is joined to the two endplates 22, 24 by placing the lateral plates in front of the lateral faces 27, 29 of the stack 26 and engaging the studs 44 in the recesses 40.

The force applied by the press is then released.

The rims 54 of the lateral plates 28, 30, are fixed to the marginal zones 57 of the lateral edges of the endplates 22, 24 by ultrasonic welding.

The appropriate product for forming the leakproof packing 55 is injected by means of a syringe, through a hole provided for this purpose in the lateral plates, either directly into the seats or, after having traversed the gasket 51, into the groove 54 of the said gasket.

The casing according to the invention makes it possible to ensure that the stack is tightened in such a way that any subsequent change in the initial tightening of the stack of elements is prevented. This tightening must be sufficiently great, and sufficiently constant, that the apparatus is leakproof as from when it is assembled and remains leakproof for a long time, and that the thickness of the passages kept free for the fluids in contact with the elements is, and remains, of the appropriate size.

The apparatus according to the invention is simple and economical to produce and lends itself to mass production.

Since the tightening of the stacks cannot be disturbed, the apparatuses delivered are of constant quality.

Furthermore, since the apparatus and in particular the clamping device or casing can be constructed without employing metallic components, they can easily be destroyed after use, in particular by incineration.

The advantages associated with the casing of the invention make it particularly valuable for the construction of apparatuses which can be used in the medical field, especially for the construction of exchange apparatuses which employ semi-permeable membranes.

We claim:

1. A casing for enclosing and compressing a stack of flat elements, said casing comprising two endplates between which the stack is to be arranged, the internal faces of the said endplates being adapted to contact the faces of the stack which are substantially parallel to the plane of the elements, at least two lateral plates, internal surfaces of said lateral plates adapted to be located in front of at least two opposite lateral faces of the stack, a plurality of studs and recesses on adjacent surfaces of the lateral plates and the endplates, cooperatingly engageable, surfaces on said studs and said recesses effective to connect said lateral plates and endplates together, when said surfaces are in engagement, the cooperating engagement surfaces of the said studs and recesses having no locking means and being at right angles to the plane of the lateral face of the stack in front of which is located the lateral plate carrying the studs or recesses, the edges of the lateral plates corresponding to the lateral edges of the endplates having rims which cover the marginal zones of the lateral edges of said endplates and are to be attached with them.

2. A casing as claimed in claim 1, wherein said recesses are located along the lateral edges of the endplates and said studs are located along the corresponding edges of the lateral plates.

3. A casing as claimed in claim 1, wherein said studs are located along the lateral edges of the endplates and said recesses are located along the corresponding edges of the lateral plates.

4. A casing as claimed in claim 1, wherein engagement surfaces of the recesses are concave cylindrical surfaces.

5. A casing as claimed in claim 4, wherein the engagement surfaces of the studs are convex cylindrical surfaces, whereby the engagement surfaces of the studs engage against the engagement surfaces of the recesses.

6. A casing as claimed in claim 1, wherein the engagement surfaces of the studs and of the recesses are cylindrical surfaces of which the directrices are arcs of a circle, the chords subtending the said arcs of a circle and the generatrices of said cylindrical surfaces being parallel to the plane of the elements and the radius of the directrices of the studs being smaller than the radius of the directrices of the recesses.

7. A casing as claimed in claim 1, wherein the cooperating engagement surfaces of the studs and of the recesses are at right angles to the plane of the internal surfaces of the lateral plates.

8. A casing as claimed in claim 1, wherein the rims are attached to the lateral edges of the endplates by welding.

9. A casing as claimed in claim 8, and further comprising bosses on the marginal zones of the lateral edges of the endplates to facilitate ultrasonic welding.

10. A casing as claimed in claim 1 and further comprising inlet and/or outlet means for at least one fluid on each lateral plate.

11. A casing as claimed in claim 10 and further comprising, on the internal face of the lateral plate, at least one seat, surrounding each inlet and/or outlet means for the fluid.

12. A casing as claimed in claim 11 and further comprising a leakproof packing placed in each seat.

13. A casing as claimed in claim 11 and further comprising a gasket placed in each seat.

14. A casing as claimed in claim 13, wherein the said gasket or gaskets is or are made of an elastic material and held pressed against the lateral faces of the stack by means of the lateral plates.

15. A casing as claimed in claim 13 and further comprising, in each gasket, a groove which is open towards the lateral face of the stack.

16. A casing as claimed in claim 13, wherein each inlet and/or outlet means is surrounded by two seats, and a gasket is placed in each seat, the said gaskets defining a groove between them.

17. A casing as claimed in claim 15 or 16, wherein a leakproof packing is placed in the groove.

18. Fluid treatment apparatus comprising a casing, a stack of flat elements positioned in said casing, said casing comprising two endplates between which the stack is arranged, internal faces of the said endplates being in contact with the faces of the stack which are substantially parallel to the plane of the elements, at least two lateral plates, internal surfaces of said lateral plates located in front of the two lateral faces of the stack, a plurality of studs and recesses on adjacent surfaces of the lateral plates and the endplates, and cooperatingly engaged surfaces on said studs and said recesses, effective to connect said lateral plates and endplates together and to hold said endplates so that said stack is compressed, the cooperating engagement surfaces of the said studs and recesses having no locking means and being at right angles to the plane of the lateral face of the stack in front of which is located the lateral plate carrying the studs or recesses, the edges of the lateral plates corresponding to the lateral edges of the endplates having rims which cover the marginal zones of the lateral edges of said endplates and are to be attached with them.

19. Apparatus as claimed in claim 18, and further comprising inlet and/or outlet means for at least one fluid in the lateral plates.

20. Apparatus as claimed in claim 19, and further comprising, on the internal face of the lateral plates, surrounding each inlet and/or outlet means for at least one fluid, at least one seat, and a gasket located on each seat, the said gaskets being kept pressed against the lateral faces of the stack by means of the lateral plates.

21. Apparatus as claimed in claim 18, wherein the stack consists of sheets of semi-permeable membranes and support plates.

22. Process for assembling a membrane apparatus according to claim 18, said process comprising the steps of:
 making up a stack of elements;
 placing the said stack between two endplates, the faces of the stack which are parallel to the plane of the elements being in contact with the internal faces of the said endplates;
 placing the assembly thus obtained between the platens of a press;
 applying the appropriate compressive force to the assembly thus obtained;
 connecting each lateral plate to the two endplates by placing the lateral plates in front of the lateral faces of the stack and engaging the studs in the corresponding recesses;
 releasing the force from the press; and
 attaching the rims of the lateral plates to the lateral edges of the endplates.

23. A process as claimed in claim 22, wherein, before positioning the lateral plates, the engagement surfaces of the studs and/or of the recesses are coated with adhesive.

24. A process as claimed in claim 22 wherein the rims of the lateral plates are attached to the lateral edges of the endplates by ultrasonically welding.

25. A process as claimed in claim 22 and further comprising the steps of providing at least one fluid inlet and/or outlet in at least one lateral plate, providing a seat on the internal surface of the lateral plate surrounding each said inlet and/or outlet and injecting an appropriate leakproofing product into the seats of the lateral plates.

26. A process as claimed in claim 22 and further comprising the steps of providing at least one fluid inlet and/or outlet in at least one lateral plate, providing a seat on the internal surface of the lateral plate surrounding each said inlet and/or outlet and, before positioning the lateral plates, placing gaskets in the seats, such that grooves are formed in the periphery of a gasket, or between two gaskets, and after having released the force exerted by the press, injecting a leakproof packing into the grooves provided in the gaskets or between two gaskets.

* * * * *